(12) United States Patent　(10) Patent No.: US 10,599,107 B2
Fuchs et al.　(45) Date of Patent: Mar. 24, 2020

(54) SYSTEM AND METHOD FOR SMART GRID DYNAMIC REGULATION POOLS

(71) Applicant: Siemens Aktiengesellschaft, München (DE)

(72) Inventors: Erich Fuchs, Mödling (AT); Maksudul Chowdhury, Fredericton (CA)

(73) Assignee: SIEMENS AKTIENGESELLSCHAFT, München (DE)

( * ) Notice: Subject to any disclaimer, the term of this patent is extended or adjusted under 35 U.S.C. 154(b) by 60 days.

(21) Appl. No.: 15/651,278

(22) Filed: Jul. 17, 2017

(65) Prior Publication Data

US 2018/0088545 A1　Mar. 29, 2018

Related U.S. Application Data

(63) Continuation-in-part of application No. 15/279,960, filed on Sep. 29, 2016, now Pat. No. 10,152,076.

(51) Int. Cl.
*G05B 15/02*　(2006.01)
*G06Q 50/06*　(2012.01)
(Continued)

(52) U.S. Cl.
CPC ........... *G05B 15/02* (2013.01); *G06Q 50/06* (2013.01); *H02J 3/381* (2013.01); *H02J 3/003* (2020.01)

(58) Field of Classification Search
CPC ......... G05B 15/02; G06Q 50/06; H02J 3/381; H02J 2003/003; H02J 3/003
See application file for complete search history.

(56) References Cited

U.S. PATENT DOCUMENTS 5,504,670 A　*　4/1996　Barth ............... G01R 31/31907
　　　　　　　　　　　　　　　　　　　　　700/5
7,120,520 B2 *　10/2006　Seto .................... B60L 11/1824
　　　　　　　　　　　　　　　　　　　　　700/297
(Continued)

FOREIGN PATENT DOCUMENTS

EP　　3057193 A1　　8/2016

OTHER PUBLICATIONS

Wikipedia; Anonymous.: "Parallel computing"—XP055267845; Retrieved from the Internet: URL:https://en.wikipedia.org/w/index.php?ttitle=Parallel_Computing&oldid=670828500 / Oct. 7, 2015.

*Primary Examiner* — Jennifer L Norton

(57) ABSTRACT

A system and method is provided for smart grid dynamic regulation pools. The system may include at least one processor configured to initiate a plurality of pool regulation tasks that are respectively executed by different processing resources. The pool regulation tasks respectively manage respective subsets of electrical power assets assigned to respective different regulation pools to fulfill electrical power requirements for market orders received from at least one energy trading market system. Such management may include determining whether to reassign at least one asset to fulfill at least one market order. Also responsive to a determination to reassign the at least one asset, the management may include removing the at least one asset from one regulation pool managed with one pool regulation task for at least one market order and assigning the removed asset to another regulation pool managed with another pool regulation task for at least one market order.

20 Claims, 5 Drawing Sheets

(51) Int. Cl.
 *H02J 3/38* (2006.01)
 *H02J 3/00* (2006.01)

(56) References Cited

U.S. PATENT DOCUMENTS

| | | | | |
|---|---|---|---|---|
| 7,343,360 | B1* | 3/2008 | Ristanovic | G06Q 30/08 |
| | | | | 705/412 |
| 7,349,887 | B2* | 3/2008 | Peljto | G06Q 30/06 |
| | | | | 705/412 |
| 8,761,953 | B2* | 6/2014 | Friedrich | G05B 13/02 |
| | | | | 700/296 |
| 9,087,359 | B2* | 7/2015 | Chassin | G06Q 30/08 |
| 9,129,337 | B2* | 9/2015 | Chassin | G06Q 30/08 |
| 9,300,137 | B2 | 3/2016 | Cherian et al. | |
| 9,807,099 | B2* | 10/2017 | Matsuoka | G06Q 30/0202 |
| 9,842,007 | B2* | 12/2017 | Albornoz | G06F 9/5083 |
| 9,842,372 | B2* | 12/2017 | Kaufman | G06Q 50/06 |
| 9,851,700 | B2* | 12/2017 | Sun | H02J 3/00 |
| 9,865,024 | B2* | 1/2018 | Mokhtari | G06Q 30/0202 |
| 9,886,014 | B2* | 2/2018 | Yoo | G05B 15/02 |
| 9,953,117 | B2* | 4/2018 | Ghosh | G06F 17/5009 |
| 9,959,332 | B2* | 5/2018 | Cai | G06F 16/27 |
| 2005/0116543 | A1* | 6/2005 | Merdjan | H02J 3/14 |
| | | | | 307/38 |
| 2010/0057529 | A1* | 3/2010 | Boss | G06Q 10/06312 |
| | | | | 705/7.22 |
| 2010/0076613 | A1 | 3/2010 | Imes | |
| 2010/0106332 | A1* | 4/2010 | Chassin | G06Q 20/102 |
| | | | | 700/278 |
| 2011/0225108 | A1* | 9/2011 | Hawkins | G06N 3/049 |
| | | | | 706/12 |
| 2012/0029897 | A1* | 2/2012 | Cherian | H02J 3/00 |
| | | | | 703/18 |
| 2013/0178992 | A1* | 7/2013 | De Graeve | F24D 17/00 |
| | | | | 700/286 |
| 2014/0180886 | A1* | 6/2014 | Forbes, Jr. | G05D 17/00 |
| | | | | 705/34 |
| 2015/0046221 | A1* | 2/2015 | Narayan | G06Q 10/06 |
| | | | | 705/7.31 |
| 2016/0098794 | A1* | 4/2016 | Mokhtari | G06Q 40/04 |
| | | | | 705/37 |
| 2016/0187395 | A1* | 6/2016 | Bodas | G01R 21/00 |
| | | | | 702/60 |
| 2016/0218505 | A1* | 7/2016 | Krupadanam | G06Q 10/06 |
| 2016/0248255 | A1* | 8/2016 | Rive | H02J 3/383 |
| 2017/0092055 | A1* | 3/2017 | Brockman | G07F 17/3225 |
| 2017/0109674 | A1* | 4/2017 | Parvania | G05F 1/66 |
| 2017/0201464 | A1* | 7/2017 | Yoo | H04L 47/70 |
| 2017/0227978 | A1* | 8/2017 | Kudo | H02J 3/32 |
| 2017/0346292 | A1* | 11/2017 | Handelsman | H02J 3/14 |
| 2017/0372244 | A1* | 12/2017 | Westergaard | H02J 3/14 |
| 2018/0358812 | A1* | 12/2018 | Anderson | H02J 3/383 |
| 2019/0020220 | A1* | 1/2019 | Lian | H02J 13/0017 |
| 2019/0288556 | A1* | 9/2019 | Sanders | H02J 3/383 |

* cited by examiner

SYSTEM AND METHOD FOR SMART GRID DYNAMIC REGULATION POOLS

CROSS-REFERENCE TO RELATED APPLICATIONS

This application is a continuation-in-part of U.S. application Ser. No. 15/279,960 filed Sep. 29, 2016, which is hereby incorporated herein by reference in its entirety.

TECHNICAL FIELD

The present disclosure is directed, in general, to managing smart electrical grid assets.

BACKGROUND

Smart electrical grids may include regulation pools that aggregate assets that consume and/or provide electrical energy resources. Such systems may benefit from improvements.

SUMMARY

Variously disclosed embodiments include data processing systems and methods that may be used to facilitate smart grid dynamic regulation pools. In one example, a system may comprise at least one processor configured via executable instructions included in at least one memory to initiate a plurality of pool regulation tasks that are respectively executed by different processing resources. The pool regulation tasks respectively manage respective subsets of electrical power assets assigned to respective different regulation pools to fulfill electrical power requirements for market orders received from at least one energy trading market system. Such management may include determining whether to reassign at least one asset to fulfill at least one market order. Also responsive to a determination to reassign the at least one asset, the management may include removing the at least one asset from one regulation pool managed with one pool regulation task for at least one market order and assigning the removed asset to another regulation pool managed with another pool regulation task for at least one market order.

In another example, a method for smart grid dynamic regulation pools may comprise acts carried out through operation of at least one processor that correspond to the functions for which the previously described at least one processor is configured to carry out.

A further example may include a non-transitory computer readable medium encoded with executable instructions (such as a software component on a storage device) that when executed, causes at least one processor to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
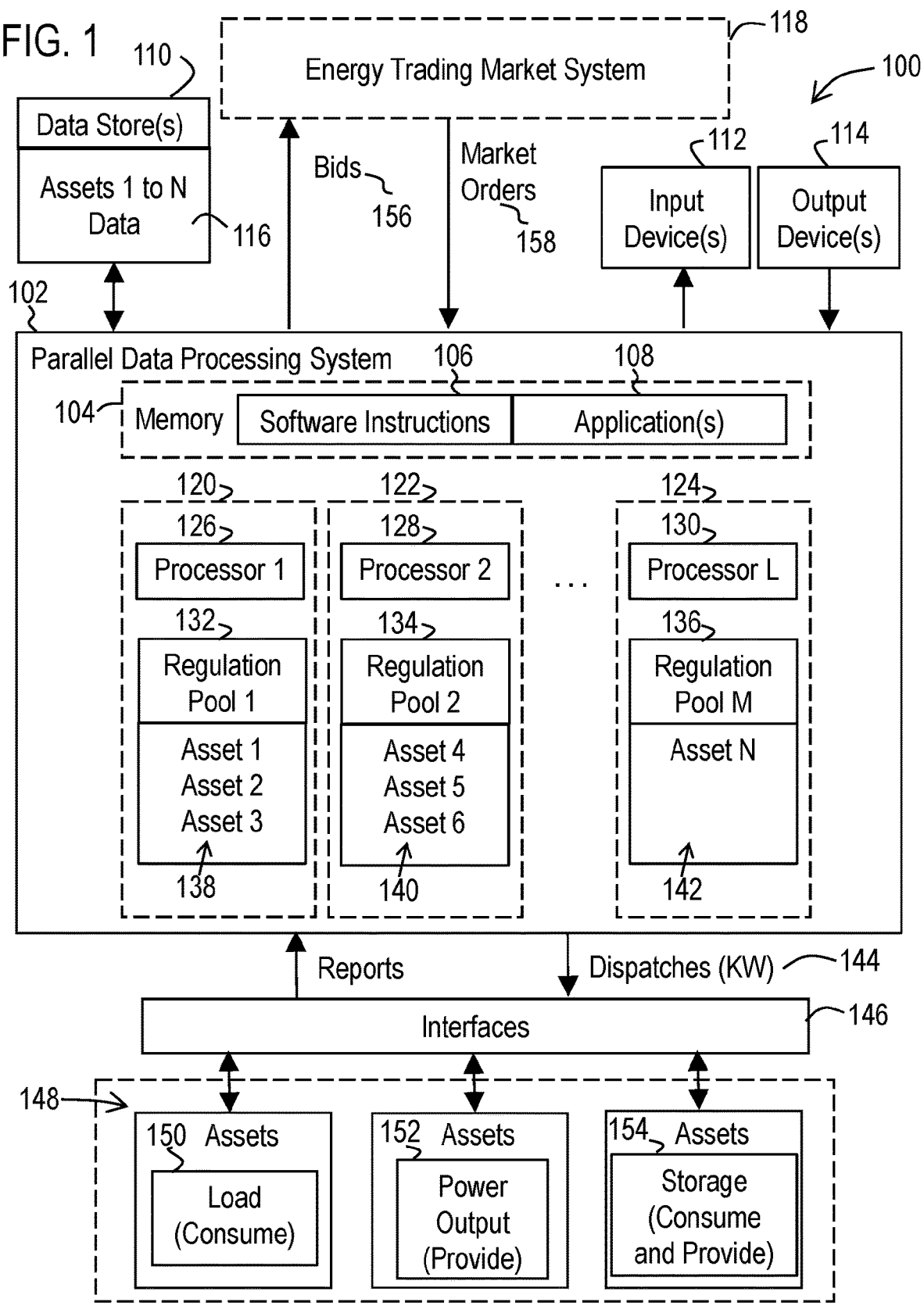
FIG. 1 illustrates a functional block diagram of an example system that facilitates smart grid dynamic regulation pools.

Various technologies that pertain to systems and methods that facilitate smart grid dynamic regulation pools will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates carrying out one or more of the embodiments described herein. The system 100 may include a parallel processing system including a plurality of processing resources 126, 128, 130 capable of carrying out a plurality of respective tasks 120, 122, 124 at the same time to carry out the various processes and functions described herein. Such processing resources may execute from at least one memory 104, executable instructions 106 (such as software instructions) corresponding to one or more software applications 108 or portions thereof that are programmed to cause the at least one processing resource to carry out the various processes and functions described herein.

This described parallel processing system, for example, may correspond to a distributed system in which each processing resource corresponds to one or more processors (e.g., a microprocessor/CPU) included respectively in different computer systems (workstations, servers). However, it should also be appreciated that the described processing resource may correspond to different cores and/or execution threads of a CPU. In addition such processing resources may correspond to virtual processors in different virtual machines executing in one or more different hypervisors executing in one or more different processors/servers.

In example embodiments, the at least one memory 104 may correspond to an internal or external volatile memory (e.g., main memory, CPU cache, and/or RAM), that is included in the processor and/or in operative connection with the processor and/or shared by one or more processors. Such a memory 104 may also correspond to a nonvolatile memory (e.g., flash memory, SSD, hard drive, or other storage device or non-transitory computer readable media) in operative connection with the processor(s).

The described data processing system 100 may include at least one input device 112 and at least one display device 114 in operative connection with one or more of the processing resources. The input device, for example, may include a mouse, keyboard, touch screen, or other type of input device capable of providing user inputs to the processor. The display device, for example, may include an LCD or AMO-LED display screen, monitor, or any other type of display device capable of displaying outputs from the processor.

The data processing system 100 may also include one or more data stores 110. The processor(s) 126, 128, 130 may be configured to manage, retrieve, generate, use, revise, and store energy management data and/or other information described herein from/in the data store 110. Examples of a data store may include a database (e.g., Oracle, Microsoft SQL Server), file system, hard drive, SSD, memory card and/or any other type of device or system that stores non-volatile data.

In example embodiments, the software application 108 may include one or more energy management software applications that may be adapted to carry out one or more of the processes and functions described herein associated with managing electrical assets 148. Examples of energy management software applications include the Siemens Smart Grid Software solutions: Demand Response Management System (DRMS); and Decentralized Energy Management System (DEMS), produced by Siemens, AG, Smart Grid Division, of Germany. However, it should be appreciated that the systems and methods described herein may be used in other energy management systems, smart grid systems, virtual power plants, and/or any other type of system that manages electrical power production and loads.

As used herein an electrical asset 148 corresponds to an electrical grid-connected device that may generate electricity, consume electricity, or both. Such assets may include distributed energy resources (DERs) which are controllable (i.e., its power output and/or power consumption can be influenced) via dispatches (i.e., messages) 144 communicated from the described system 102. Electrical assets may include load asset types 150 that consume electrical power such as air conditioners, HVACs, baseboard heaters, building lighting systems, other controllable loads, or any combination thereof. Electrical assets may also include power output asset types 152 such as solar power panels, wind turbines, generators, other power generation assets that output power, or any combination thereof. Further electrical assets may also include storage asset types 154 such as batteries that may both consume power (when charging) or output power (when discharging).

In example embodiments, dispatches, for example, may specify one or more target absolute, maximum and/or minimum amounts of power for which the DER should be configured to consume and/or output during a specified time period. Such dispatches may be communicated by the system 102 to one or more different types of interfaces 146 (e.g., networks/controllers) that are responsible for managing the operation of particular types of DERs. The described software instructions may be configured to communicate in the particular protocols and/or message formats for these different types of interfaces in order to influence the operation of the DERs and to receive status or other operational information from the DERS (e.g., on/off status, current power consumption and/or output levels). Such interfaces may communicate according to data communication specifications/protocols such as Multispeak, OpenADR, DNP3, IEC 61850, IEC 104, and/or any other type of communication interface that are usable to manage DERs.

It should be appreciated that assets may be grouped into regulation pools that in combination represent an amount of power (forecasted for different time periods ahead of actual need) that must be purchased from or sold to an energy (or capacity) trading market. As described in U.S. application Ser. No. 15/279,960, an example embodiment of the application software may include features used to facilitate aggregation of controllable DERs as a single manageable flexible load class or group for use in a virtual power plant (VPP). The example regulation pools 132, 134, 136 described herein may include one or more such load classes or groups.

The example software application 108 may facilitate interfacing with energy trading market systems 118 in order to submit a bid 156 for an amount of power to an energy market and/or a capacity market and receive a market order 158 therefrom for providing or consuming at least a portion of the amount of power included in the bid. Examples of such energy trading market systems may include Markets Gateway provided by PJM of Audubon, Pa., which is a tool that allows members to submit information and obtain data needed to conduct business in the day-ahead, regulation and synchronized reserve markets. Another example of a market system includes the Energy Market Desk at NB power in New Brunswick, Canada.

Within an example energy management software application (such as Siemens DEMS), data 116 regarding generation and load assets may be persisted in one or more data stores 110. This information, as well as other external details, can then be used to generate forecasts for power generation, consumption and/or available capacity for those assets.

Provided each asset has the required prequalification to participate within a market (e.g., energy or capacity), these individual asset forecast can then be aggregated into an overall bid (i.e., an offer) to be submitted to the energy trading market system 118 (e.g., an energy and/or capacity market desk). The market desk will then respond with an order containing none, all or a portion of the submitted offer, which the market participant is then required to fulfill.

With various assets eligible for several markets simultaneously, including multiple types of markets (e.g., energy or capacity), there is a challenge associated with how best to optimize the usage of the available assets given that the number of assets targeted can be very high (several thousands). Additional complexity is applied to this processing because the market eligibility per asset varies and is a function of time. In example embodiments, this challenge is solved by the introduction of dynamic regulation pools, which enable the assets to work together to satisfy commitments while maintaining the flexibility to be used in the most effective manner. This solution lends itself to scalable distributed processing, as single threaded algorithms may be far too slow for the cyclic processing required during the supervision and control of these regulation pools.

The concept behind a regulation pool is that a grouping of assets is often required to fulfill a market commitment. This grouping of assets needs to be supervised and controlled, therefore a construct is required to aggregate them together over a period of time. To ensure the appropriate assets are assigned to the regulation pool, the various markets that a particular regulation pool supports are identified within the regulation pool configuration using the software application 108.

A regulation pool can serve one market and/or multiple markets simultaneously; however, care must be taken to ensure that the signals from the markets configured within a particular regulation pool will not be in direct contradiction with each other. Cyclic processing of the assets contained within these regulation pools within a defined period of time is required to fulfill regulatory requirements. As such, there needs to be control over the contents of these regulation pools to ensure minimum processing times are achieved. Minimum processor times, for example, may include managing the operation of each asset via dispatches within 5 seconds or other minimum processing time required for a particular market.

As illustrated in FIG. 1, minimum processing times may be achieved via the system initiating a plurality of pool regulation tasks 120, 122, 124, that are respectively executed by different processing resources 126, 128, 130. The pool regulation tasks respectively manage respective subsets 138, 140, 142 of electrical power assets assigned to respective different regulation pools 132, 134, 136 to fulfill electrical power requirements for market orders 158 received from at least one energy trading market system 118.

In this example, the system may manage N numbers of assets using M numbers of regulation pools configured within the system. At least some of the regulation pools may be managed in respective different pool regulation tasks, which in this example are respectively executed by different ones of L number of processors. For example, a system that manages 1000 assets may initiate 3 or more pool regulation tasks to handle respectively 3 or more regulation pools managing different subsets of the 1000 assets.

When a market returns a market order 158 to the system 100 (i.e., a market participant) as a response to a submitted offer 156, the participant is then required to fulfill the received order. However, how that order is fulfilled is a decision of the system, provided the assets used are eligible for participation within the target market. The assets being used to satisfy an order is not a trivial calculation, as there is a desire to optimize asset usage and costs. In the case of a partial order, some subset of the assets identified for inclusion within the original offer will need to be reserved for use during the order delivery. This determination is done via the order processing logic carried out by the software application 108, which can leverage one of several different algorithms assigned to the target market.

Such algorithms are configured to determine which assets 148 to assign to different regulation pools 132, 134, 136. As illustrated in FIG. 1, each regulation pool may be assigned to a different subset 138, 140, 142 of the total number of available assets 148. These algorithms will identify which assets are optimal to meet the needs of the received order, as well as the configured collateralization strategy, which provides a level of assurance that the commitment will still be fulfilled in the event of an unforeseen circumstance. Also assets (such as load assets) may be assigned to each regulation pool based on opportunity costs associated with the load asset, corresponding to a cost associated with a dispatch for the load asset that influences either an increase or decrease in the power consumption of the load asset. The end result of this processing will be the assignment of the required assets to the desired regulation pool.

In example embodiments, the described regulation pools 132, 134, 136 may correspond to dynamic regulation pools. The functionality of dynamic regulation pools comes into play when assets are eligible for participation within multiple markets simultaneously. The association of an asset to a regulation pool is a time effective dated relationship, meaning that the assignment exists for a determined period of time. At any given time, the assets included in the regulation pool are identified by the assets that have a cyclic time requirement relationship, which intersects with the current time. Moving forward in time, the assets that are allocated to the regulation pool will change as these relationships will expire and new ones will begin.

Adapting regulation pools to be dynamic, enables assets that were previously assigned to an initial regulation pool to be moved into a different regulation pool. This may be carried out before and/or during power provisioning of the asset (e.g., during the trading phase when bids/orders are carried out and/or during the provisioning phase when assets are online and fulfilling a particular market order). In some cases, the reassigned asset may still contribute to the original market commitment, provided that market is also configured within the second regulation pool. In addition, as the number of participants within a market grows, additional regulation pools can be created to support those particular markets.

This allows for the cyclic processing of assets to be reassigned and distributed in different regulation pools assigned to different processing resources 126, 128, 130 (e.g., processors, cores, threads, servers, virtual machines), allowing for the application to satisfy regulatory requirements, even as the scale of the system continues to increase. Such reassignment of assets may be based on a plurality of different reassignment trigger scenarios that can be evaluated/determined by the system (e.g., via one or more processing resources 120, 122, 124 and/or one or more other processing resources associated with the system).

In example embodiments, a reassignment may be carried out responsive to determining that an asset that was marketed already in an energy market only is later on also marketed successfully in a capacity market. Such an asset may be assigned to the capacity market via being reassigned to a regulation pool associated with a market order for the capacity market. In addition, a reassignment may be carried out responsive to determining that an asset that was not marketed at all for a certain time period for a capacity market but is eligible for a capacity market is needed for a regulation pool for a capacity market order as additional collateralization of the capacity market order associated with the regulation pool. Such an asset may be reassigned to the regulation pool for the capacity market order for at least portions of that time period.

In another example, a reassignment may be carried out responsive to determining that trouble during online monitoring of the provision of assets for a first regulation pool for a first market order (e.g. unforeseen failure of too many assets) requires a reassignment of at least one asset from a second regulation pool for a second market order to the first regulation pool for the first market. Such a reassignment may be based on the at least one asset being necessary to fulfill the first market order and not being necessary to fulfill the second market order and/or based on the first market order having higher penalty than the second market order for failure to fulfill the respective market orders.

Figure 2:
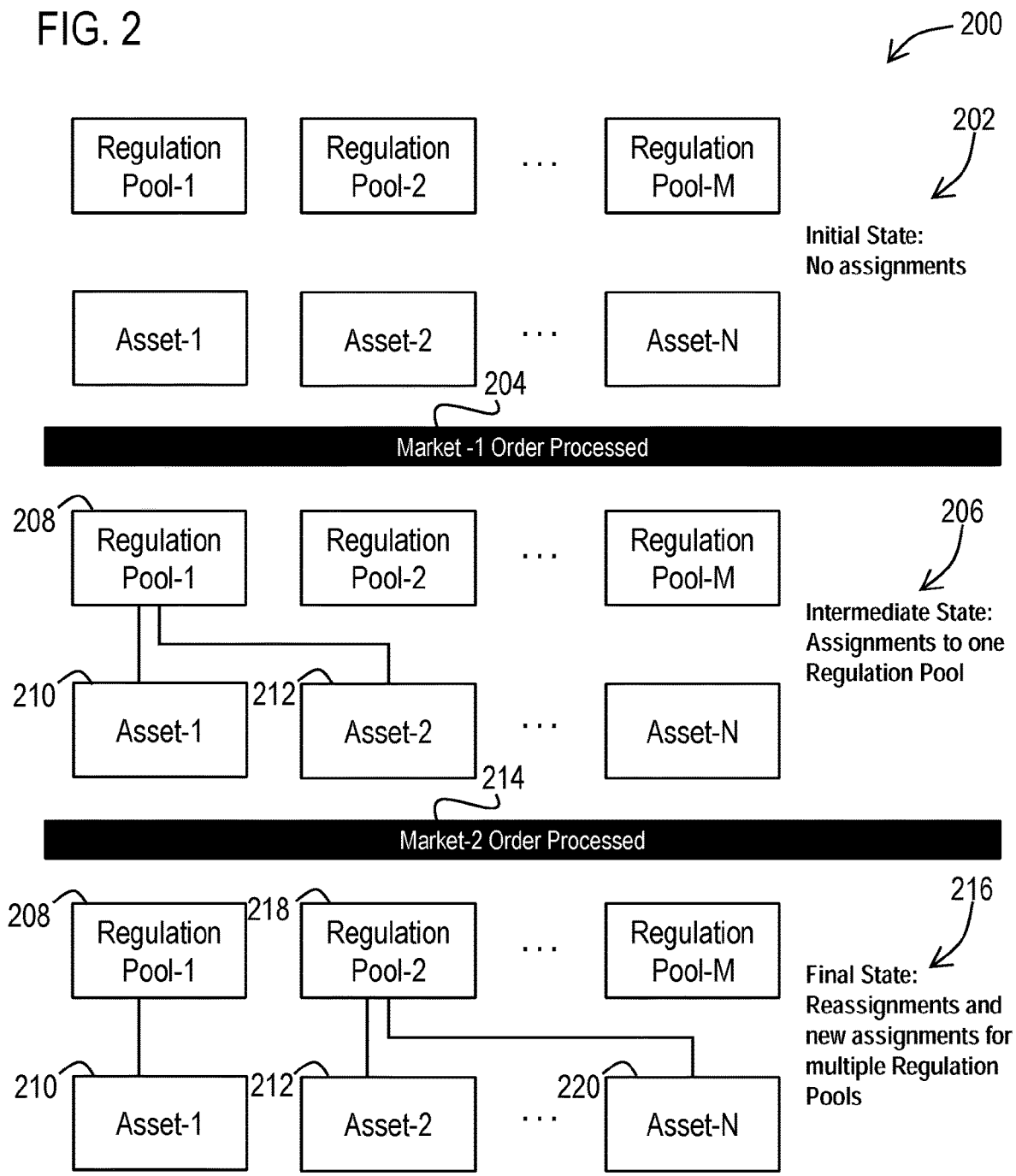
FIG. 2 illustrates an example of processing logic that enables the regulation pools to be dynamic

FIG. 2 illustrates an example of processing logic 200 (carried out by the application software 108) that enables the regulation pools to be dynamic. Three different states are represented, as the order processing logic would occur for a particular market to transition the system from one state to the other. However, it should be appreciated that many such transitions may be carried out for a plurality of different assets and a plurality of different regulation pools for a plurality of different market orders.

In this example, in an initial state 202 of the software application 108 there may be no initial relations formed between assets and regulation pools. When a received market order is processed for a Market-1 204, the system may transition to the intermediate state 206, in which the assets 210, 212 (asset 1 and asset 2) required to fulfill that Market-1 commitment in the market order are assigned to the appropriate regulation pool such as Regulation Pool-1 208.

The dynamic regulation pools are leveraged within the transition to the illustrated final state 216. At this point a market order for Market-2 214 is processed and the assets required to fulfill that market commitment are assigned to the appropriate regulation pool. These assignments include new relationships, as well as reassigned relationships. For example, Asset-2 212, (previously assigned to Regulation Pool-1 208) may be transitioned so as to be assigned to Regulation Pool-2 218. Regulation Pool-2 may also be assigned additional assets such as Asset-N 220.

Regulation Pool-2 216 has thus been configured to support market orders for both Market-1 and Market-2 204, 214 and the assets are therefore able to continue to fulfill the previously assigned commitments for the market orders.

This order processing and reassignment of asset to regulation pool relationships is an ongoing process, as many markets will exist in the system, each having their independent order processing time and the assets may have various cyclic time requirements. This can be intraday, weekly or even longer and the thousands of assets which exist in the system will each have to be considered regularly and assigned as optimal. As the scale of the system increases, additional regulation pools managed by different processing resources can be introduced, reducing the overall processing load on other regulation pools. Using this approach, the system may better be able to meet regulated processing times even when there are a large number of eligible assets.

Figure 3:
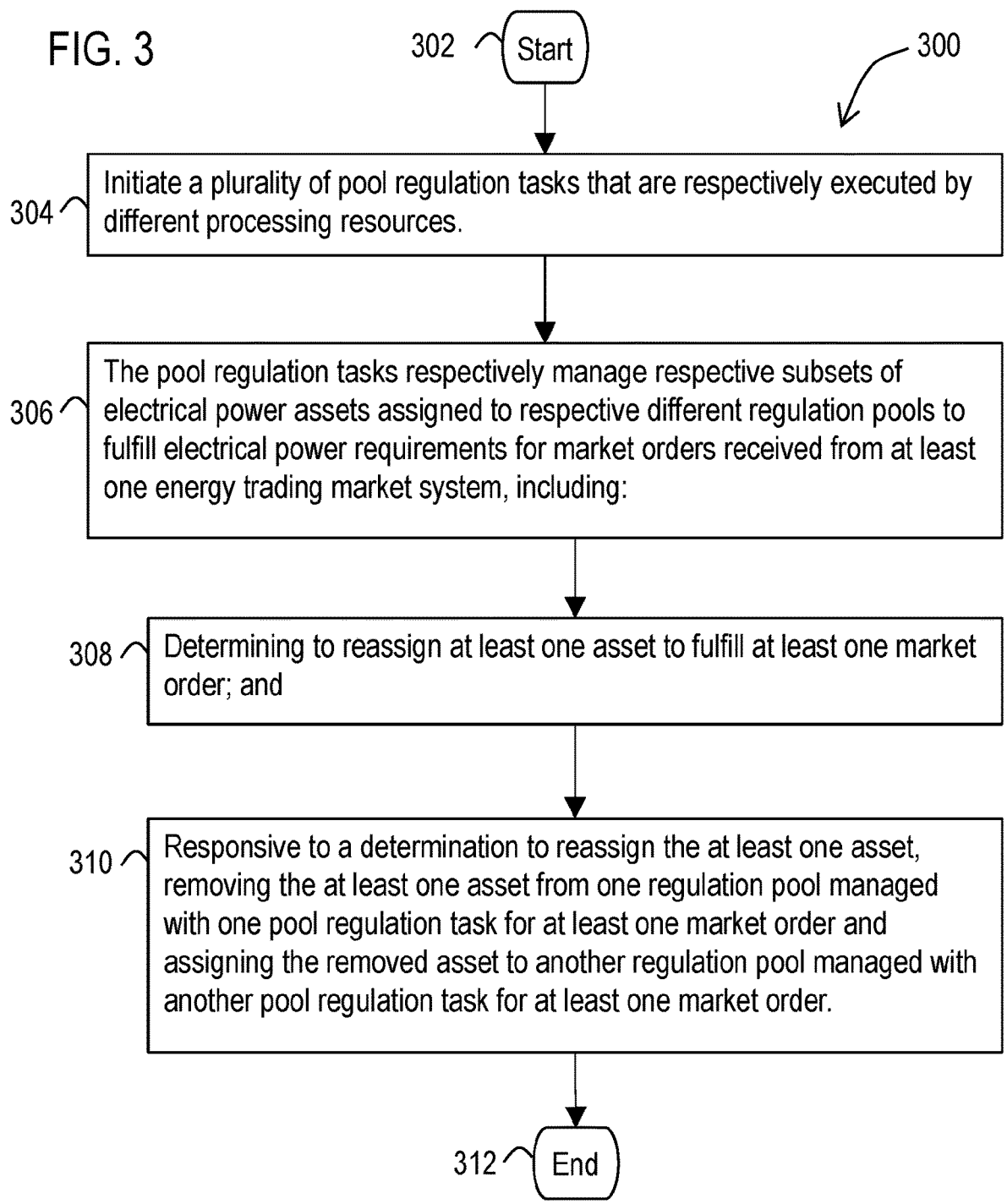
FIGS. 3-4 illustrate flow diagrams of example methodologies that facilitate smart grid dynamic regulation pools.
Figure 4:
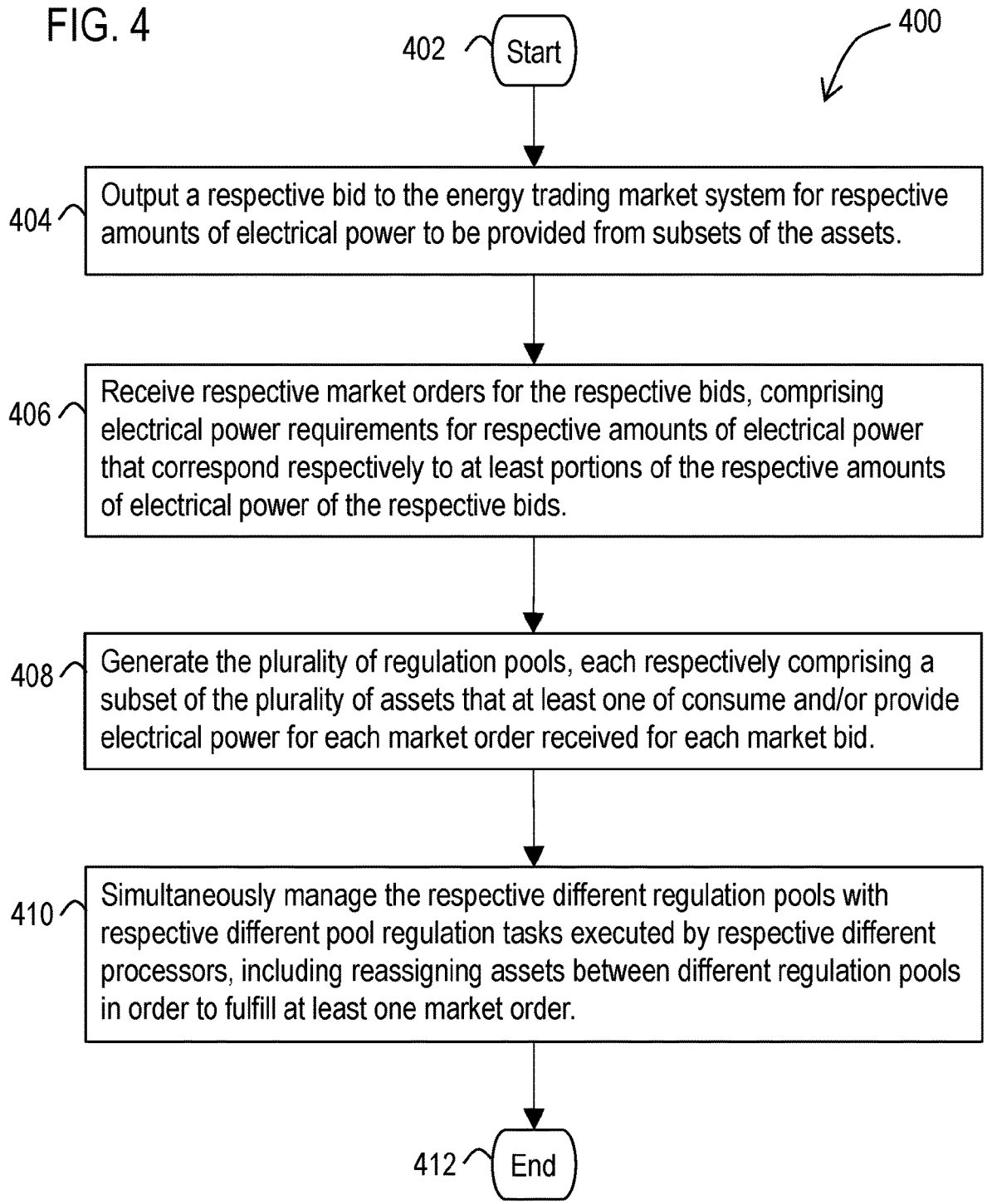

Referring now to FIGS. 3 and 4, methodologies 300, 400 are illustrated that facilitate smart grid dynamic regulation pools. While the methodologies are described as being a series of acts that are performed in a sequence, it is to be understood that the methodologies may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

With respect to FIG. 3 the methodology 300 may start at 302 and may include several acts carried out through operation of at least one processor. These acts may include an act 304 of initiating a plurality of pool regulation tasks that are respectively executed by different processing resources. These acts may also include an act 306 with the pool regulation tasks respectively managing respective subsets of electrical power assets assigned to respective different regulation pools to fulfill electrical power requirements for market orders received from at least one energy trading market system. Such managing may include an act 308 of determining to reassign at least one asset to fulfill at least one market order. Such managing may also include an act 310 of responsive to the determination to reassign the at least one asset, removing the at least one asset from one regulation pool managed with one pool regulation task for at least one market order and assigning the removed asset to another regulation pool managed with another pool regulation task for at least one market order. At 312 the methodology may end.

With respect to FIG. 4 the methodology 400 may start at 402 and may include several acts carried out through operation of at least one processor. These acts may include an act 404 of outputting a respective bid to the energy trading market system for respective amounts of electrical power to be provided from subsets of the assets. These acts may also include an act 406 of receiving respective market orders for the respective bids, comprising electrical power requirements for respective amounts of electrical power that correspond respectively to at least portions of the respective amounts of electrical power of the respective bids. Also these acts may include an act 408 of generating the plurality of regulation pools, each respectively comprising a subset of the plurality of assets that at least one of consume and/or provide electrical power for each market order received for each market bid. In addition these acts may include an act 410 of simultaneously managing the respective different regulation pools with respective different pool regulation tasks executed by respective different processors, including reassigning assets between different regulation pools in order to fulfill at least one market order. At 412 the methodology may end.

Also, it should be appreciated that this described methodology may include additional acts and/or alternative acts corresponding to the features described previously with respect to the data processing system 100.

For example, the methodologies may include an act of outputting dispatches to control at least some of the subset of assets in each respective regulation pool according to the respective market orders.

An example embodiment of the act 308 of determining to reassign at least one asset to fulfill at least one market order may include determining that an asset that was marketed already in an energy market only is later on also marketed successfully in a capacity market. The act 308 of determining to reassign may also include determining that an asset that was not marketed at all for a certain time period for a capacity market but is eligible for a capacity market is needed for a regulation pool for a capacity market order as additional collateralization of the capacity market order associated with the regulation pool.

The act 308 of determining to reassign may also include determining that trouble during online monitoring of the provision of assets for a first regulation pool for a first market order requires a reassignment of at least one asset from a second regulation pool for a second market order to the first regulation pool for the first market. Such reassignment may be on the at least one asset being necessary to fulfill the first market order and not being necessary to fulfill the second market order and/or the first market order having higher penalty than the second market order for failure to fulfill the respective market orders.

In these described methodologies, at least one regulation pool may include at least one load asset and at least one power output asset. The at least one load asset may include at least one of an air conditioner, an HVAC, baseboard heater, building lighting system, or any combination thereof.

Also, the at least one power output asset may include at least one solar power panel, wind turbine, generator, or any combination thereof.

As discussed previously, acts associated with the above-described methodologies (other than any described manual acts) may be carried out by one or more processors 126, 128, 130. Such processor(s) may be included in one or more data processing systems 100, for example, that execute from at least one memory 104 executable instructions 106 (such as software instructions) that are operative to cause these acts to be carried out by the one or more processors.

Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination of the processor with the software instructions loaded/installed into the described memory (volatile and/or non-volatile), which are currently being executed and/or are available to be executed by the processor to cause the processor to carry out the described/claimed process or function. Thus, a processor that is powered off or is executing other software, but has the described software instructions installed on a storage device in operative connection therewith (such as a hard drive or SSD) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software instructions and/or corresponding firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C#, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 5:
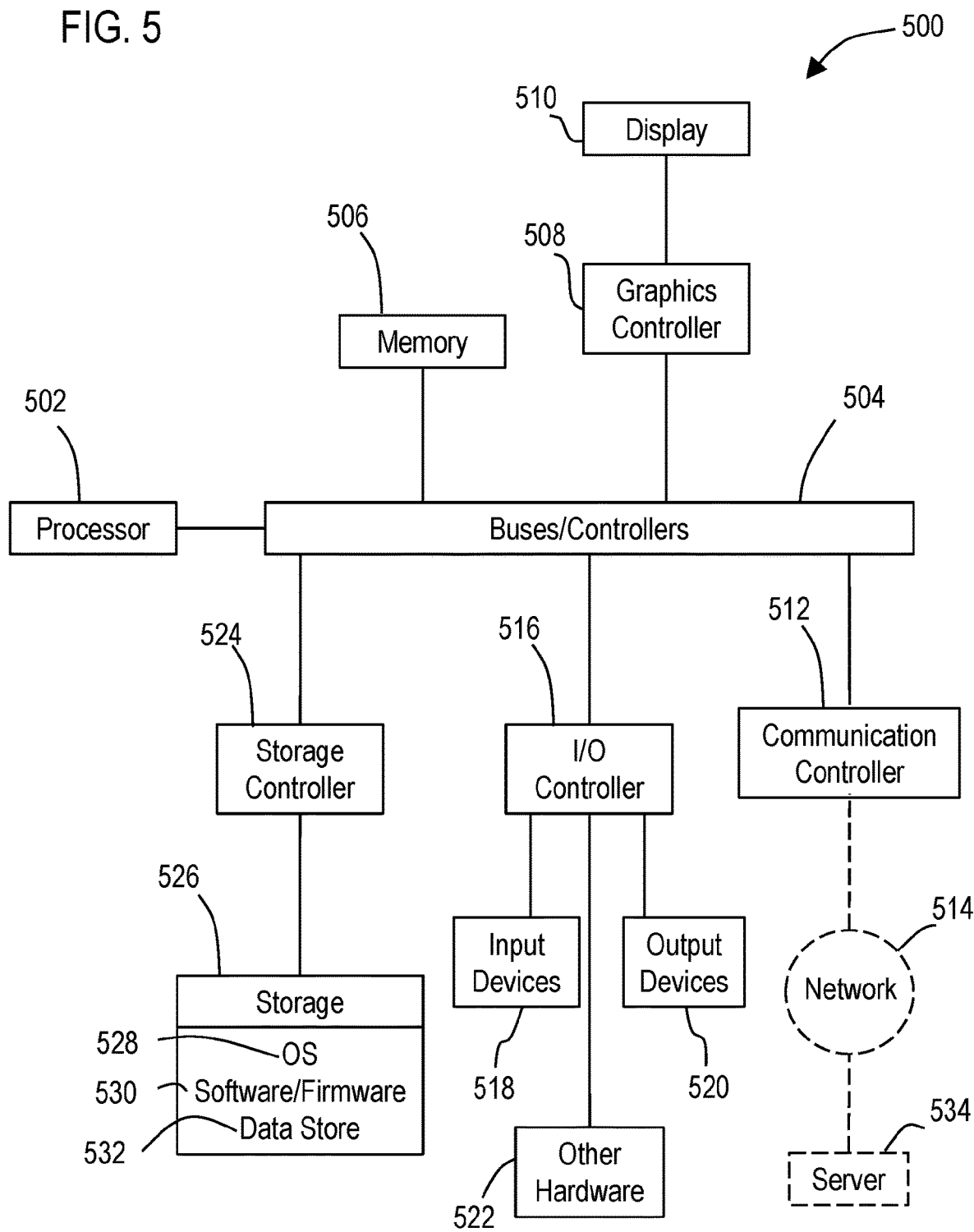
FIG. 5 illustrates a block diagram of a data processing system in which an embodiment may be implemented.

FIG. 5 illustrates a block diagram of a data processing system 500 (e.g., a computer system) in which an embodiment can be implemented, such as the previously described system 100, and/or other system operatively configured by computer/processor executable instructions, circuits, or otherwise to perform the functions and processes as described herein. The data processing system depicted includes at least one processor 502 (e.g., a CPU) that may be connected to one or more bridges/controllers/buses 504 (e.g., a north bridge, a south bridge). One of the buses 504, for example, may include one or more I/O buses such as a PCI Express bus. Also connected to various buses in the depicted example may include a main memory 506 (RAM) and a graphics controller 508. The graphics controller 508 may be connected to one or more display devices 510 (e.g., LCD or AMOLED display screen, monitor, VR headset, and/or projector). It should also be noted that the processor 502 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 512 (Ethernet controllers, WiFi controllers, cellular controllers) operative to connect to a local area network (LAN), Wide Area Network (WAN), a cellular network, and/or other wired or wireless networks 514 or communication equipment.

Further components connected to various busses may include one or more I/O controllers 516 such as USB controllers, Bluetooth controllers, and/or dedicated audio controllers (connected to speakers and/or microphones). It should also be appreciated that various peripherals may be connected to the I/O controller(s) (via various ports and connections) including input devices 518 (e.g., keyboard, mouse, pointer, touch screen, touch pad, drawing tablet, trackball, buttons, keypad, game controller, gamepad, camera, microphone, scanners, motion sensing devices that capture motion gestures), output devices 520 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 502 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 522 connected to the I/O controllers 516 may include any type of device, machine, or component that is configured to communicate with a data processing system.

Additional components connected to various busses may include one or more storage controllers 524 (e.g., SATA). A storage controller may be connected to a storage device 526 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 504 such as a PCI Express bus.

A data processing system in accordance with an embodiment of the present disclosure may include an operating system 528, software/firmware 530, and data stores 532 (that may be stored on a storage device 526 and/or the memory 506). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 512 may be connected to the network 514 (which may or may not be a part of a data processing system 500), which can be any local, wide area, remote, private, and/or public data processing system network or combination of networks, as known to those of skill in the art, including the Internet. Data processing system 500 can communicate over the network 514 with one or more other data processing systems such as a server 534 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 502 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Those of ordinary skill in the art will appreciate that the hardware depicted for the data processing system may vary for particular implementations. For example, the data processing system 500 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 500 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for controlling physical electrical power assets, the system comprising:
   at least one processor configured via executable instructions included in at least one memory to:
   initiate a plurality of pool regulation tasks that are respectively executed by different respective processors of the at least one processor;
   respectively manage, by the plurality of pool regulation tasks, respective subsets of electrical power assets assigned to different regulation pools to fulfill electrical power requirements for market orders received from at least one energy trading market system, the respective management comprising:
   determination of whether to reassign at least one electrical power asset of the respective subsets of electrical power assets to fulfill at least one of the market orders;
   responsive to a determination to reassign the at least one electrical power asset, remove the at least one electrical power asset from one regulation pool of the respective different regulation pools managed with one pool regulation task of the plurality of pool regulation tasks for another market order of the market orders and assign the removed at least one electrical power asset to another regulation pool of the respective different regulation pools managed with another pool regulation task of the plurality of pool regulation tasks for the at least one market order; and
   control of the at least one electrical power asset, such that electric power is provided, electric power is consumed, or electric power is provided and electric power is consumed,
   wherein the respective subsets of electrical power assets comprise one or more load assets, one or more power output assets, one or more storage asset types, or any combination thereof.

2. The system according to claim 1, wherein the at least one processor is further configured to:
   output respective bids to the at least one energy trading market system for respective amounts of electrical power to be provided from the respective subsets of electrical power assets managed by the plurality of pool regulation tasks;
   receive respective market orders for the respective bids, the respective market orders comprising electrical power requirements for respective amounts of electrical power that correspond respectively to at least portions of the respective amounts of electrical power of the respective bids;
   generate a plurality of regulation pools, each regulation pool of the plurality of regulation pools respectively comprising a subset of the electrical power assets, at least one electrical power asset of the respective subset of electrical power assets being operable to consume, provide, or consume and provide electrical power for each market order of the respective market orders received for each market bid of the respective bids; and
   simultaneously manage the plurality of regulation pools with corresponding pool regulation tasks of the plurality of pool regulation tasks executed by the different respective processors of the at least one processor, such that electrical power assets of the respective subsets of electrical power assets are reassigned between different regulation pools of the plurality of regulation pools in order to fulfill one or more market orders of the respective market orders.

3. The system according to claim 2, wherein the at least one processor is configured to:
   output dispatches to control at least some of the respective subsets of electrical power assets represented by the electrical power assets in each respective regulation pool according to the respective market orders.

4. The system according to claim 3, wherein the determination of whether to reassign at least one electrical power asset of the respective subsets of electrical power assets to fulfill at least one of the market orders includes:
   determination that an electrical power asset that was marketed already in an energy market only is later on also marketed successfully in a capacity market;

determination that an electrical power asset that was not marketed at all for a certain time period for a capacity market but is eligible for a capacity market is needed for a regulation pool of the plurality of regulation pools for a capacity market order as additional collateralization of the capacity market order associated with the regulation pool;

determination that trouble during online monitoring of a provision of electrical power assets of the respective subsets of electrical power assets for a first regulation pool of the plurality of regulation pools for a first of the market orders that requires a reassignment of one or more electrical power assets of the respective subsets of electrical power assets from a second regulation pool of the plurality of regulation pools for a second market order of the market orders to the first regulation pool for the first market order based on the one or more electrical power assets being necessary to fulfill the first market order and not being necessary to fulfill the second market order, the first market order having higher penalty than the second market order for failure to fulfill the respective market orders, or a combination thereof; or any combination thereof.

5. The system according to claim 2, wherein at least one regulation pool of the plurality of regulation pools includes at least one load asset and at least one power output asset.

6. The system according to claim 5, wherein the at least one load asset includes at least one air conditioner, HVAC, baseboard heater, building lighting system, or any combination thereof.

7. The system according to claim 6, wherein the at least one power output asset includes at least one solar power panel, wind turbine, generator, or any combination thereof.

8. A method for controlling a provisioning of physical electrical power assets, the method comprising:
through operating at least one processor:
initiating a plurality of pool regulation tasks that are respectively executed by different respective processors of the at least one processor;
respectively managing, by the plurality of pool regulation tasks, respective subsets of electrical power assets assigned to different regulation pools, such that electrical power requirements are fulfilled for market orders received from at least one energy trading market system, the respective managing including:
determining to reassign at least one electrical power asset of the respective subsets of electrical power assets, such that at least one market order of the market orders is fulfilled;
responsive to the determining to reassign the at least one electrical power asset, removing the at least one electrical power asset from one regulation pool of the respective different regulation pools managed with one pool regulation task of the plurality of pool regulation tasks for at least one of the market orders and assigning the removed at least one electrical power asset to another regulation pool of the respective different regulation pools managed with another pool regulation task of the plurality of pool regulation tasks for at least one other of the market orders; and
controlling the at least one electrical power asset, such that electric power is provided, electric power is consumed, or electric power is provided and electric power is consumed.

9. The method according to claim 8, further comprising, through operating the at least one processor:
outputting one or more respective bids to the at least one energy trading market system for respective amounts of electrical power to be provided from the respective subsets of electrical power assets;
receiving respective market orders of the market orders for the one or more respective bids, the received respective market orders comprising electrical power requirements for respective amounts of electrical power that correspond respectively to at least portions of the respective amounts of electrical power of the one or more respective bids;
generating a plurality of regulation pools, each regulation pool of the plurality of regulation pools respectively comprising a subset of the respective subsets of electrical power assets that consume, provide, or consume and provide electrical power for each market order received for each market bid; and
simultaneously managing the plurality of regulation pools with corresponding pool regulation tasks of the plurality of pool regulation tasks executed by the different respective processors, wherein simultaneously managing the plurality of regulation pools includes reassigning electrical power assets of the respective subsets of electrical power assets between different regulation pools of the plurality of regulation pools such that at least one of the market orders is fulfilled.

10. The method according to claim 9, further comprising, through operating the at least one processor:
outputting dispatches to control at least some of the respective subsets of the electrical power assets in each respective regulation pool according to the respective market orders.

11. The method according to claim 10, wherein determining to reassign at least one electrical power asset includes determining that:
an electrical power asset of the respective subsets of electrical power assets that was marketed already in an energy market only is later on also marketed successfully in a capacity market;
an electrical power asset of the respective subsets of electrical power assets that was not marketed at all for a certain time period for a capacity market but is eligible for a capacity market is needed for a regulation pool of the plurality of regulation pools for a capacity market order as additional collateralization of the capacity market order associated with the regulation pool;
trouble during online monitoring of a provision of electrical power assets of the respective subsets of electrical power assets for a first regulation pool of the plurality of regulation pools for a first of the market orders requires a reassignment of one or more electrical power assets from a second regulation pool of the plurality of regulation pools for a second of the market orders to the first regulation pool for the first market order based on the one or more electrical power assets being necessary to fulfill the first market order and not being necessary to fulfill the second market order, the first market order having higher penalty than the second market order for failure to fulfill the respective market orders, or a combination thereof; or
any combination thereof.

12. The method according to claim 9, wherein at least one regulation pool of the plurality of regulation pools includes at least one load asset and at least one power output asset.

13. The method according to claim 12, wherein the at least one load asset includes at least one air conditioner, at least one HVAC, at least one baseboard heater, at least one building lighting system, or any combination thereof.

14. The method according to claim 13, wherein the at least one power output asset includes at least one solar power panel, at least one wind turbine, at least one generator, or any combination thereof.

15. A non-transitory computer-readable storage medium encoded with instructions executable by at least one processor to control physical electrical power assets, the instructions comprising:

initiating a plurality of pool regulation tasks that are respectively executed by different respective processors of the at least one processor;

respectively managing, by the plurality of pool regulation tasks, respective subsets of electrical power assets assigned to different regulation pools, such that electrical power requirements are fulfilled for market orders received from at least one energy trading market system, the respective managing including:

determining to reassign at least one electrical power asset of the respective subsets of electrical power assets, such that at least one of the market orders is fulfilled;

responsive to the determining to reassign the at least one electrical power asset, removing the at least one electrical power asset from one regulation pool of the respective different regulation pools managed with one pool regulation task of the plurality of pool regulation tasks for one or more of the market orders and assigning the at least one removed electrical power asset to another regulation pool of the respective different regulation pools managed with another pool regulation task of the plurality of regulations tasks for another one or more of the market orders; and controlling the at least one electrical power asset, such that electric power is provided, electric power is consumed, or electric power is provided and electric power is consumed, wherein the respective subsets of electrical power assets comprise load asset types, power output asset types, storage asset types, or any combination thereof.

16. The non-transitory computer-readable storage medium according to claim 15, wherein the instructions further comprise:

outputting respective bids to at least one energy trading market system for respective amounts of electrical power to be provided from the respective subsets of the electrical power assets;

receiving respective market orders of the market orders for the respective bids, the respective market orders comprising electrical power requirements for respective amounts of electrical power that correspond respectively to at least portions of the respective amounts of electrical power of the respective bids;

generating a plurality of regulation pools, each regulation pool of the plurality of regulation pools respectively comprising a subset of electrical power assets of the respective subsets of the electrical power assets that consume, provide, or consume and provide electrical power for each market order received for each market bid; and simultaneously managing the plurality of regulation pools with corresponding pool regulation tasks of the plurality of pool regulation tasks executed by the different respective processors, the simultaneously managing including reassigning electrical power assets of the respective subsets of electrical power assets between different regulation pools of the respective different regulation pools, such that at least one of the market orders is fulfilled.

17. The non-transitory computer-readable storage medium according to claim 16, wherein the instructions further comprise:

outputting dispatches to control at least some of a subset of electrical power assets of the respective subsets of electrical power assets represented in each respective regulation pool according to the respective market orders.

18. The non-transitory computer-readable storage medium according to claim 17, wherein determining to reassign at least one electrical power asset to fulfill at least one market order includes determining that:

an electrical power asset of the respective subsets of electrical power assets that was marketed already in an energy market only is later on also marketed successfully in a capacity market;

an electrical power asset that was not marketed at all for a certain time period for a capacity market but is eligible for a capacity market is needed for a regulation pool of the plurality of regulation pools for a capacity market order as additional collateralization of the capacity market order associated with the regulation pool;

trouble during online monitoring of a provision of electrical power assets of the respective subsets of electrical power assets for a first regulation pool of the plurality of regulation pools for a first of the market orders requires a reassignment of one or more electrical power assets of the respective subsets of electrical power assets from a second regulation pool of the plurality of regulation pools for a second of the market orders to the first regulation pool for the first market order based on the one or more assets being necessary to fulfill the first market order and not being necessary to fulfill the second market order, the first market order having higher penalty than the second market order for failure to fulfill the respective market orders, or a combination thereof; or any combination thereof.

19. The non-transitory computer-readable storage medium according to claim 16, wherein at least one regulation pool of the plurality of regulation pools includes at least one load asset and at least one power output asset.

20. The non-transitory computer-readable storage medium according to claim 19, wherein the at least one load asset includes at least one air conditioner, at least one HVAC, at least one baseboard heater, at least one building lighting system, or any combination thereof, and wherein the at least one power output asset includes at least one solar power panel, at least one wind turbine, at least one generator, or any combination thereof.

\* \* \* \* \*